United States Patent Office 3,847,947
Patented Nov. 12, 1974

---

3,847,947
QUATERNARY THENYL PHOSPHONIUM SALTS
Peter F. Epstein, Prairie Village, Kans., assignor to Chemagro Corporation
No Drawing. Continuation of abandoned application Ser. No. 18,745, Mar. 11, 1970. This application July 3, 1972, Ser. No. 268,321
Int. Cl. C07d 63/14
U.S. Cl. 260—332.5
7 Claims

ABSTRACT OF THE DISCLOSURE

Quaternary thenyl phosphonium salts, i.e. [(optionally 2,3,4 and/or alkyl-substituted)-2- or 3-thenyl]-[tri(same or mixed) alkyl and/or aryl]-phosphonium salts, i.e. halides, cyanides, thiocyanates, O,O-diethyl-dithiophosphates, nitrates, O-ethyl-xanthates and N - methyl - dithiocarbamates, which possess plant-growth regulating properties, including synergistic properties, and which may be produced by conventional methods.

---

This is a continuation of application Serial No. 18,745, filed Mar. 11, 1970, now abandoned.

The present invention relates to and has for its objects the provision for particular new quaternary thenyl phosphonium salts, i.e. [(optionally 2,3,4 and/or 5-mono-di and tri [same or mixed] halo and/or aryl-substituted)-2- or 3-thenyl]-[tri (same or mixed alkyl and/or aryl]-phosphonium salts, i.e. halides, cyanides, thiocyanates, O,O-diethyl-dithiophosphates, nitrates, O-ethyl xanthates and N-methyl-dithiocarbamates, which possess valuable plant-growth regulating properties, including synergistic properties, active compositions in the form of mixtures of such compounds with solid and liquid dispersible carrier vehicles, and methods for producing such compounds and for using such compounds in a new way, especially for regulating, e.g. selectively retarding and/or promoting, the growth of plants or vegetation of the most varied kinds, including synergistic plant growth regulation, with other and further objects of the invention becoming apparent from a study of the within specification and accompanying examples.

It is known in the prior art that quaternary phosphonium salts, such as the quaternary phosphonium salt, (2,4-dichlorobenzyl)-(tri-n-butyl)phosphonium chloride, of the formula

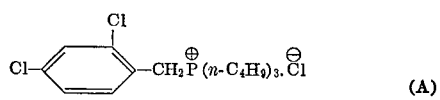

(A)

can be used to control the growth of vegetation (cf. U.S. Pat. 3,268,323).

S,S,S-tri-n-butyl-phosphoro-trithioate (B), which may be designated (DEF); maleic hydrazide (C), which may be designated (MH-30); and S,S,S-tri-n-butyl-phosphoro-trithioite (D), which may be designated (Folex); are also known individually as plant growth regulants.

It has been found, in accordance with the present invention, that the particular new quaternary thenyl phosphonium salts, i.e. (optionally halogen and/or alkyl substituted 2- and 3-thenyl)-(tri- alkyl and/or aryl)-phosphonium salts, having the general formulae

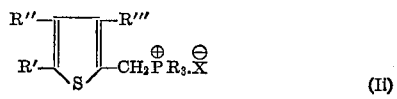

(II)

and

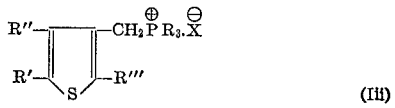

(III)

in which

R′, R″ and R‴ each individually is hydrogen, halogen or alkyl of 1–4 carbon atoms,
R each individually is an alkyl and/or optionally substituted aryl radical, and
X⊖ is a monovalent anion such as halogen, pseudo-halogen, and other monovalent anions, exhibit strong growth-controlling, in particular growth-inhibiting, effects without significant concomitant phytotoxic effects.

It has furthermore been found, in accordance with the present invention, that the compounds of formulae (Ii) and (Iii) above may be produced by a process which comprises reacting a corresponding thenyl halide of the formula

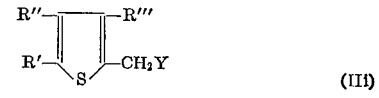

(IIi)

or

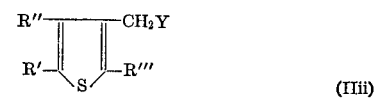

(IIii)

in which

R′, R″ and R‴ are the same as defined above, and Y is halogen with a tertiary phosphine of the formula

PR₃ (III)

in which

R is the same as defined above, optionally in the presence of a solvent.

The nature of the anionic portion of the resulting molecule of the specific halide compound of formula (Ii) or (Iii) above so produced, i.e. X⊖ as defined above, can be varied, for example, by further reacting such specific halide compound of formula (Ii) or (Iii) with the alkali metal (e.g. sodium, potassium, and the like) or silver salt (IV) of the desired anion, or in other conventional ways which are readily apparent to anyone skilled in the art.

Surprisingly, the compounds of formulae (Ii) and (Iii) above according to the present invention show a more pronounced growth regulatory activity, with concomitantly reduced phytotoxicity, than the analogous quaternary phosphonium compounds known from the prior art, such as compound (A) noted above, which are chemically the closest active compounds having the same type of activity. The instant compounds, unlike said analogous phosphonium salts of the prior art, can be used significantly in the form of foliar sprays without appreciable phytotoxicity or destruction of chlorophyll when used at biologically efficacious rates. Additionally, unlike such analogous compounds of the prior art, the instant active compounds enhance synergistically the known biological efficacy of, for instance, compounds (B) and (C), i.e. S,S,S-tributyl phosphorotrithioate (DEF) and maleic hydrazide (MH–30) while, in the case of the latter, reducing the undesirable phytotoxicity associated with the use thereof alone at comparable rates. The active compounds according to the present invention therefore represent a valuable contribution to the art.

If, for instance, 5-chloro-2-thenyl chloride (IIa) and tri-n-butyl phosphine (IIIa) are used as starting materials, the course of the reaction can be represented by the following reaction scheme:

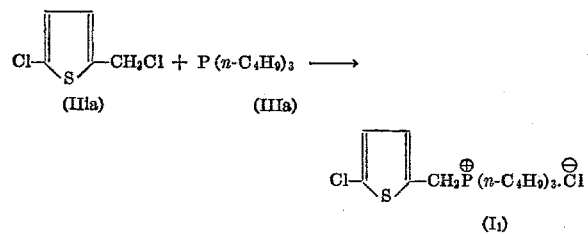

The course of the anion exchange reaction in which (5-chloro - 2 - thenyl)-(tri-n-butyl)-phosphonium chloride (1) and potassium thiocyanate are used as starting materials can be represented by the following equation:

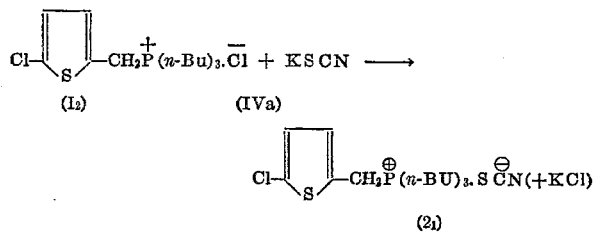

Advantageously, in accordance with the present invention, in the various formulae herein:

R', R'' and R''' each individually represents hydrogen;
  halo such as chloro, bromo, iodo and/or fluoro, especially chloro and/or bromo; and/or
  straight and branched chain lower alkyl hydrocarbon of 1–4 carbon atoms such as methyl, ethyl, n- and iso-propyl, n-, iso-, sec.- and tert.-butyl, and the like, such that R', R'' and R''' are the same or different groups;

R each individually represents
  straight and branched chain alkyl hydrocarbon of 1–12 carbon atoms such as methyl to tert.-butyl inclusive as defined above, pentyl, hexyl, heptyl, n- and iso-octyl, nonyl, decyl, undecyl, dodecyl, and the like, especially lower alkyl, $C_{4-12}$ or $C_{4-8}$ alkyl, and $C_4$ or $C_8$ alkyl and more especially n-butyl (i.e. n-Bu), iso-butyl, n-octyl and iso-octyl;
  phenyl; and/or
  lower alkyl-substituted phenyl such as 2-, 3- or 4-methyl to tert.-butyl inclusive as defined above, -substituted phenyl, and the like, especially $C_{1-4}$ or $C_{1-3}$ or $C_{1-2}$ alkyl-phenyl, and more especially 2-, 3- or 4-methyl-phenyl;

such that the three R groups are the same or different;

and $X^\ominus$ represents a monovalent anion including
  halide ion such as chloride, bromide, iodide and fluoride, especially chloride and bromide ions,
  pseudohalide ion such as cyanide, thiocyanate, and the like, especially thiocyanate ion,
  O,O-diethyl-dithiophosphate ion, i.e. O,O-diethyl-thionophosphoryl-thiolate;
  nitrate ion;
  O-ethyl-xanthate ion; or
  N,N-dimethyl dithiocarbamate ion.

It will be noted that the point of attachment of the phosphorus-bearing side chain to the thiophene ring can be either in the 2- or 3-position of the nucleus depending on the intermediate used and on the nature of the substituents R', R'' and R'''.

Preferred compounds of the present invention include:

(1) (5-chloro-2-thenyl)-(tri-n-butyl)-phosphonium chloride
(3) 2-(thenyl)-(tri-n-butyl)-phosphonium chloride
(4) (2,5-dichloro-3-thenyl)-(tri-n-butyl)-phosphonium chloride
(5) (5-bromo-2-thenyl)-(tri-n-butyl)-phosphonium chloride
(6) (2,5-dibromo-3-thenyl)-(tri-n-butyl)-phosphonium chloride
(22) (2-thenyl)-(tri-n-butyl)-phosphonium nitrate
(23) (2,5-dichloro-3-thenyl)-(tri-n-butyl)-phosphonium nitrate
(12) (5-bromo-2-thenyl)-(tri-phenyl)-phosphonium chloride
(16) (2,5-dichloro-3-thenyl)-(tri-phenyl)-phosphonium chloride
(18) (2,5-dibromo-3-thenyl)-(tri-phenyl)-phosphonium chloride
(17) (5-chloro-2-thenyl)-(tri-phenyl)-phosphonium chloride
(2) (5-chloro-2-thenyl)-(tri-n-butyl)-phosphonium thiocyanate
(24) (2-thenyl)-(tri-n-butyl)-phosphonium thiocyanate
(25) (2,5-dichloro-3-thenyl)-(tri-n-butyl)-phosphonium thiocyanate
(9) (5-bromo-2-thenyl)-(tri-n-butyl)-phosphonium O,O-diethyl-dithiophosphate
(26) (2-thenyl)-(tri-n-butyl)-phosphonium-O,O-diethyl-xanthate
(27) (2,5-dichloro-3-thenyl)-(tri-n-butyl)-phosphonium-N,N-dimethyldithiocarbamate
(10) (5-chloro-2-thenyl)-(tri-n-octyl)-phosphonium chloride
(11) (5-bromo-2-thenyl)-(tri-n-octyl)-phosphonium chloride
(14) (5-bromo-2-thenyl)-(tri-n-octyl)-phosphonium thiocyanate
(19) (2-thenyl)-(tri-phenyl)-phosphonium chloride
(20) (2-thenyl)-(tri-n-octyl)-phosphonium chloride
(21) (5-chloro-2-thenyl)-(tri-n-octyl)-phosphonium thiocyanate
(7) (2-chloro-5-bromo-3-thenyl)-(tri-n-butyl)-phosphonium chloride
(13) (3-thenyl)-(tri-n-butyl)-phosphonium bromide
(15) (5-chloro-2-thenyl)-(dimethyl)-(phenyl)-phosphonium chloride In accordance with one embodiment of the present invention, R', R'' and R''' each individually is hydrogen; or one or more is either chloro or bromo; R is n-butyl; and $X^\ominus$ is a chloride, bromide, thiocyanate or nitrate ion; and more specifically in formula (Ii) above, R' is chloro or bromo; R'' and R''' are both hydrogen; R is n-butyl; and $X^\ominus$ is a chloride, nitrate or thiocyanate ion, whereas in formula (Iii) above, R' and R''' are both chloro or bromo; R'' is hydrogen; R is n-butyl; and $X^\ominus$ is a chloride, thiocyanate or nitrate ion.

Preferably, R', R'' and R''' each individually is hydrogen; or halo, especially chloro or bromo; R each individually is $C_{1-12}$ alkyl, especially $C_{4-12}$ or $C_{4-8}$ or $C_4$ or $C_8$ alkyl; or phenyl; and $X^\ominus$ is a halide, especially chloride or bromide ion; or a thiocyanate ion or a nitrate ion; or an O,O - diethyl-dithiophosphate ion, or an O - ethyl xanthate ion, or an N,N-dimethyl dithiocarbamate ion.

More particularly, R' and R''' each individually is hydrogen; or chloro; or bromo; R'' is hydrogen; R is n-butyl; or n-octyl; or phenyl; and $X^\ominus$ is a chloride ion; or a bromide ion; or a thiocyanate ion; or a nitrate ion; or an O,O-diethyl-dithiophosphate ion.

Most particularly, in formula (Ii) above, R' is hydrogen; or chloro; or bromo; R'' and R''' are both hydrogen; R is n-butyl; or phenyl; and $X^\ominus$ is a chloride ion, whereas in formula (Iii) above, R' and R''' are both chloro; or are both bromo; R'' is hydrogen; R is n-butyl; or phenyl; and $X^\ominus$ is a chloride or a nitrate ion.

The types of starting thenyl halides usable in accordance with the process of the present invention are clearly characterized by formulae (IIi) and (IIii) noted above.

These starting compounds are well known and can be prepared readily on an industrial scale. (See e.g. Henry D. Norris, U.S. Pat. 2,623,049.)

As examples of such starting thenyl halides which can be used in accordance with the present invention, there may be mentioned in particular:

2-thenyl chloride
3-thenyl bromide
5-chloro-2-thenyl chloride
5-bromo-2-thenyl chloride
5-methyl-2-thenyl chloride
2,5-dichloro-3-thenyl chloride
2,5-dibromo-3-thenyl chloride
2,4,5-trichloro-3-thenyl chloride
3,4,5-trichloro-2-thenyl chloride
2,4,5-tribromo-3-thenyl chloride
3,4,5-tribromo-2-thenyl chloride
2-chloro-5-bromo-3-thenyl chloride
2-bromo-5-chloro-3-thenyl chloride
5-iodo-2-thenyl chloride
5-fluoro-2-thenyl chloride
2-methyl-5-chloro-3-thenyl chloride
2,5-dimethyl-3-thenyl chloride, and the like.

The types of starting trialkyl, triaryl, or mixed tri-alkyl-aryl substituted phosphines usable in accordance with the process of the present invention are clearly characterized by formula (III) noted above.

These starting compounds are also well known and can be prepared readily on an industrial scale.

As examples of such starting trialkyl, triaryl, or mixed tri-alkyl-aryl phosphines which can be used in accordance with the present invention, there may be mentioned in particular:

tri-$n$-butyl phosphine
tri-$n$-octyl phosphine
triphenyl phosphine
phenyl-dimethyl-phosphine, and the like.

The production reaction is carried out preferably in the presence of a solvent (this term includes a mere diluent), particularly one in which the solubility of the final product is not very high and which is inert to the reaction. Examples of such solvents include inert organic solvents, for example, hydrocarbons such as $n$-hexane, $n$-heptane, benzine, benzene and toluene; ethers such as diethyl ether, dioxane and tetrahydrofuran; lower boiling aliphatic nitriles such as acetonitrile; amides such as dimethyl formamide; alkyl sulfoxides such as dimethyl sulfoxide; aliphatic ketones such as acetone; chlorinated aliphatic hydrocarbons such as chloroform and dichloromethane; and the like; aliphatic alcohol esters of aliphatic carboxylic acids such as ethyl acetate and the like; and any desired mixtures of these solvents.

The use of anhydrous and non-hydroxylic solvents and the absence of oxygen are desirable factors in the optimization of yield and product quality but are not essential to the success of the reaction.

The reaction temperature can be varied within a fairly wide range. In general the reaction is carried out at substantially between about $-20°$ C. and $+130°$ C., preferably between about $20°$ C. and $80°$ C.

In general, for economy and efficiency, the reactants are used in approximately equimolar proportions. The reaction can, for example, be carried out in such a manner that the thenyl halide, for example 5-chloro-2-thenyl chloride, is added to a solution of the phosphine, for example tri-$n$-butyl phosphine, in anhydrous ether at room temperature, and the reaction mixture allowed to stand for several days at room temperature, the resulting solid crystalline product being recovered by filtration. The product thus prepared can be obtained in a substantially pure form by repeated washings with cold anhydrous ether.

The 2- (or 3-) thenyl trialkyl, triaryl, or mixed tri-alkyl-aryl phosphonium halides thus prepared can, if desired, be converted correspondingly into other anionic phosphonium salts of the desired anionic component in the conventional manner in a solvent such as acetone, ethanol or dimethyl formamide in which both of the reagents are appreciably soluble. After separation of the metal halide (e.g. sodium, potassium, silver, and the like, halide) formed in the reaction, removal of the solvent under reduced pressure yields the desired salt in substantially pure form.

Advantageously, the active compounds according to the present invention exhibit strong growth-regulatory properties. Such compounds can therefore be used to affect the rate of growth of plants. Since at rates and in concentrations showing high growth regulatory activity the instant active compounds have little or no phytotoxic action, these effects on plant growth can be obtained with little or no damage to useful plants. The instant compounds also possess comparatively low mammalian toxicity.

By plants are meant in the broadest sense all useful vegetation including valuable agricultural, horticultural, fruiticultural, and the like, crop vegetation, weeds, etc., the growth regulation of which is desired.

Thus, the active compounds according to the present invention can be used for stunting or retarding the growth of monocotolydenous and dicotolydenous crop and weed plants, ornamental plants, shrubs, and trees;

for increasing beneficially the yield, oil yield and protein yield of leguminous plants such as soybeans, lima beans, snap beans, peas, and the like;

for affecting the fruit set of spermatophytic plants, i.e. apples, peaches and other fruit of fruitbearing trees, shrubs or crop plants;

for increasing the resistance of vegetation, particularly fruit trees, to the damage caused by frost and drought;

for increasing the sugar content or yield of plants such as sugar beet, sugar cane, and the like;

for enhancing synergistically the defoliating action of S,S,S-tri-n-butyl phosphoro-trithioate (DEF) by increasing the percentage defoliation and by partially inhibiting the regrowth of foliage in defoliated plants, particularly cotton, soybeans and other similar types of plants;

for retarding the growth of grasses such as Kentucky Bluegrass, fescue, and the like, by reducing both the clipping weight per unit area and the plant height, and thus providing a means of chemical mowing;

for enhancing synergistically the action of maleic hydrazide (MH–30) in retarding the growth of grasses such as Kentucky Bluegrass, fescue, and the like, by reducing both the clipping weight per unit area and the plant height, thus also providing such chemical mowing;

for reducing synergistically the tendency of maleic hydrazide (MH–30), when used alone at comparable rates, to produce phytotoxic injury to grass plants such as Kentucky Bluegrass, fescue, and the like;

for inhibiting or partially inhibiting the undesirable growth of suckers on plants, particularly tobacco plants;

for enhancing synergistically the effect of maleic hydrazide (MH–30) for the aforesaid use of inhibiting undesirable growth of suckers on plants, without inflicting appreciable phytotoxic damage or otherwise affecting adversely the quality of the crop;

for affecting, i.e. breaking the dormancy of plants, such as potato plants and the like, by causing them to sprout.

As aforesaid, significantly, the instant active compounds can be used in the form of foliar sprays without appreciable phytotoxicity or destruction of chlorophyll, i.e. at the biologically efficacious rates normally applied.

The active compounds according to the instant invention can be utilized, if desired, in the form of the usual formulations or compositions with conventional, preferably inert (i.e. plant compatible or herbicially inert), pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compound with conventional pesticide dispersible liquid diluent carriers and/or dispersible solid carriers, optionally with the use of carrier vehicle assistants, e.g., conventional pesticide surface-active agents, including emulsifying agents and/or dispersing agents whereby, for example, in the case where water is used as diluent, organic solvents may be added as auxiliary solvents. The following may be chiefly considered for use as conventional carrier vehicles for the purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. dichloromethane, etc.), alcohols (e.g. methanol, ethanol, propanol, butanol, etc.), amines (e.g. 2-aminoethanol, etc.), ethers, ether-alcohols (e.g. 2-methoxyethanol, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolin, alumina, silica, chalk, i.e., calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as conventional plant-growth regulators, fungicides, insecticides, nematicides, bactericides, selective herbicides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.01–5.0%, preferably 0.01–0.8%, by weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vhicle assistan, e.g., surface active agent, such as an emulsifying agent and/or a dispersing agent, and an amount of the active compound which is effective for the purpose in question and which is generally between about 0.01–95%, and preferably 0.01–5.0%, by weight of the mixture.

Conveniently, the instant active compounds, having appreciable solubility in water, are preferably usable in the form of aqueous solutions containing substantially between 0.01% and 5%, preferably 0.01%–0.8%, by weight of the active compound, with or without the addition of stabilizers, surface active agents, etc., as mentioned above. Such solutions are particularly useful for direct foliar spray application, in which as noted above (unlike the analogous quaternary phosphonium compounds of the prior art) they do not cause appreciable phytotoxic plant injury at efficacious growth regulating rates of application.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by wegiht of the active compound or even the 100% active substance alone, e.g. about 20–100% by weight of the active compound.

Furthermore, the present invention contemplates methods of selectively controlling the rate of growth of plants; e.g. stunting plant growth, increasing plant or fruit yield, protein yield, oil yield, sugar yield, resisatnce to frost and drought damage; synergising defoliating action and inhibiting regrowth; effecting chemical mowing; preventing the growth of undesirable suckers; breaking plant dormancy and the like; which comprise applying to at least one of (a) such plants and (b) their habitat, i.e. the locus to be protected or controlled, an efficacious or growth rate controlling amount of the particular active compound of the invention alone or together with a carrier vehicle as noted above. The instant formulations or compositions are applied in the usual manner, for example, by spraying, atomizing, scattering, dusting, watering, sprinkling and the like, either to the soil around the plants, the plants themselves, or both.

It will be realized, of course, that in connection with the use of the instant compounds for influencing the growth of plants and/or effecting the other desirable results heretofore mentioned, the concentration of the particular active compound utilized in admixture with the carrier vehicle will depend upon the intended application and may be varied within a fairly wide range depending upon the weather conditions, the purpose for which the active compound is used, e.g. growth promoting or growth retarding effect, and the plant species in which it is intended to produce the desired effect. Therefore, in special cases it is possible to go above or below the aforementioned concentration ranges.

The outstanding growth regulatory activity of the particular active compounds of the present invention is illustrated, without limitation, by the following examples.

EXAMPLE 1

Cucumber Root Growth Test

Wettable powder base consisting of:

92 parts by weight hydrated silica (ultra fine, "Hi-Sil 233")

4 parts by weight sodium lignin sulfonate ("Maraspere N")

4 parts by weight polycondensate of ethylene oxide, propylene oxide and propylene glycol (mol. wt. about 1000) ("Pluronic L–61")

To produce a suitable preparation of the particular active compound, 1 part by weight of such active compound is mixed intimately with 1 part by weight of the stated wettable powder base, and the resulting mixture is diluted with water to the desired final concentration. A piece of round filter paper (150 mm. diameter) is placed in a 150 mm. x 25 mm. Petri dish, and 10 cucumber seeds are arranged in a row on the paper. The filter paper is then moistened with 7 mls. of the preparation of the given active compound.

The so-treated dish is incubated in darkness at 22° C. Rating is determined on the basis of growth response of the root during the period of twenty-four (24) hours between the third and fourth day of incubation.

A "0" to "9" scale rating is used to indicate the activity of potential growth retardants. A "0" scale reading indicates growth retardation with the range of 0–10% as compared with the control. A "9" scale reading corresponds to 90% or more growth retardation. On the other hand, figures in parentheses indicate growth promotion or enhancement. Thus, a "(0)" to "(9)" scale rating is used to indicate the activity of potential growth promotants. "(0)" indicates growth promotion within the range of 0–10% as compared with the control, whereas "(9)" indicates 90% or greater growth promotion when compared with the control.

The particular active compounds tested, the amounts used and the results obtained can be seen from the following Table 1.

TABLE 1

| Active compound | Concentration (p.p.m.) | | |
|---|---|---|---|
| | 10,000 | 1,000 | 100 |
| ($1_1$) Cl–[thiophene]–$CH_2\overset{\oplus}{P}(n\text{-Bu})_3 \cdot \overset{\ominus}{Cl}$ | 9 | 9 | 9 |
| ($3_1$) Same as above | 9 | 9 | 9 |
| ($5_1$) Br–[thiophene]–$CH_2\overset{\oplus}{P}(n\text{-Bu})_3 \cdot \overset{\ominus}{Cl}$ | 9 | 9 | 9 |
| ($12_1$) Br–[thiophene]–$CH_2\overset{\oplus}{P}Ph_3 \cdot \overset{\ominus}{Cl}$ | 9 | 9 | 9 |
| ($4_1$) Cl–[thiophene]–Cl, $CH_2\overset{\oplus}{P}(n\text{-Bu})_3 \cdot \overset{\ominus}{Cl}$ | 9 | 9 | 9 |
| ($16_1$) Cl–[thiophene]–Cl, $CH_2\overset{\oplus}{P}Ph_3 \cdot \overset{\ominus}{Cl}$ | 9 | 9 | 9 |
| ($6_1$) Br–[thiophene]–Br, $CH_2\overset{\oplus}{P}(n\text{-Bu})_3 \cdot \overset{\ominus}{Cl}$ | 9 | 9 | 9 |
| ($18_1$) Br–[thiophene]–Br, $CH_2\overset{\oplus}{P}Ph_3 \cdot \overset{\ominus}{Cl}$ | 9 | 9 | 9 |
| ($10_1$) Cl–[thiophene]–$CH_2\overset{\oplus}{P}(n\text{-}C_8H_{17})_3 \cdot \overset{\ominus}{Cl}$ | 9 | 7 | 2 |
| ($11_1$) Br–[thiophene]–$CH_2\overset{\oplus}{P}(n\text{-}C_8H_{17})_3 \cdot \overset{\ominus}{Cl}$ | 9 | 5 | 1 |
| ($2_1$) Cl–[thiophene]–$CH_2\overset{\oplus}{P}(n\text{-Bu})_3 \cdot \overset{\ominus}{S}CN$ | 9 | 9 | 9 |
| ($21_1$) Cl–[thiophene]–$CH_2\overset{\oplus}{P}(n\text{-}C_8H_{17})_3 \overset{\ominus}{S}CN$ | 2 | 2 | 1 |
| ($14_1$) Br–[thiophene]–$CH_2\overset{\oplus}{P}(n\text{-}C_8H_{17})_3 \overset{\ominus}{S}CN$ | 2 | (1) | (2) |
| ($9_1$) Br–[thiophene]–$CH_2\overset{\oplus}{P}(n\text{-Bu})_3 \overset{\ominus}{S}\overset{S}{\overset{\|}{P}}(OEt)_2$ | 9 | 9 | 9 |
| ($19_1$) [thiophene]–$CH_2\overset{\oplus}{P}(n\text{-}C_8H_{17})_3 \overset{\ominus}{Cl}$ | 9 | 9 | 7 |
| ($20_1$) [thiophene]–$CH_2\overset{\oplus}{P}Ph_3 \cdot \overset{\ominus}{Cl}$ | 9 | 9 | 9 |
| ($22_1$) [thiophene]–$CH_2\overset{\oplus}{P}(n\text{-Bu})_3 \cdot \overset{\ominus}{N}O_3$ | 9 | 9 | 9 |
| ($23_1$) Cl–[thiophene]–Cl, $CH_2\overset{\oplus}{P}(n\text{-Bu})_3 \cdot \overset{\ominus}{N}O_3$ | 9 | 9 | 9 |
| ($24_1$) [thiophene]–$CH_2\overset{\oplus}{P}(n\text{-Bu})_3 \cdot \overset{\ominus}{S}CN$ | 9 | 9 | 8 |
| ($25_1$) Cl–[thiophene]–Cl, $CH_2\overset{\oplus}{P}(n\text{-Bu})_3 \cdot \overset{\ominus}{S}CN$ | 9 | 9 | 9 |
| ($26_1$) [thiophene]–$CH_2\overset{\oplus}{P}(n\text{-Bu})_3 \cdot \overset{\ominus}{S}-\overset{S}{\overset{\|}{C}}OC_2H_5$ | 9 | 9 | 9 |
| ($27_1$) Cl–[thiophene]–Cl, $CH_2\overset{\oplus}{P}(n\text{-Bu})_3 \cdot \overset{\ominus}{S}-\overset{S}{\overset{\|}{C}}N(CH_3)_2$ | 9 | 8 | 7 |

EXAMPLE 2

Snap Bean Foliar Spray Test

Wettable powder base consisting of:

92 parts by weight hydrated silica (ultra fine, "Hi-Sil 233")

4 parts by weight sodium lignin sulfonate ("Marasperse N")

4 parts by weight polycondensate of ethylene oxide, propylene oxide and propylene glycol (mol. wt. about 1000) ("Pluronic L-61")

To produce a suitable preparation of the particular active compound, 1 part by weight of such active compound is mixed intimately with 1 part by weight of the stated wettable powder base, and the resulting mixture is diluted with water, containing 0.01% polyoxyethylene sorbitan monolaurate (Tween 20) as emulsifier, to the desired final concentration.

Snap bean plants, as soon as the primary leaves are relatively smooth (6-7 days old) and are capable or absorbing and translocating chemicals, are sprayed (treated) with the given active compound preparation at the indicated concentration until just dew moist. For each test pared with the control, whereas "(9)" indicates 90% or greater growth promotion as compared with the control.

The particular active compounds tested, the amounts used and the results obtained can be seen from the following Table 2.

TABLE 2

| Active compound | Concentration (p.p.m.) | | | | | | | | |
|---|---|---|---|---|---|---|---|---|---|
| | 10,000 | | | 1,000 | | | 100 | | |
| | a | b | c | a | b | c | a | b | c |
| (A) Cl-⌬(Cl)-CH₂P⁺(n-Bu)₃·Cl⁻ (known) | (*) | (*) | (*) | 1 | 4 | 5 | 0 | 0 | 0 |
| (1₄) Cl-[S]-CH₂P⁺(n-Bu)₃·Cl⁻ | 4 | 9 | 9 | 4 | 8 | 9 | 4 | 7 | 6 |
| (3₂) [S]-CH₂P⁺(n-Bu)₃·Cl⁻ | 4 | 8 | 9 | 4 | 8 | 7 | 0 | 0 | 1 |
| (5₂) Br-[S]-CH₂P⁺(n-Bu)₃·Cl⁻ | (*) | (*) | (*) | (*) | (*) | (*) | 2 | 2 | 0 |
| (12₂) Br-[S]-CH₂P⁺Ph₃·Cl⁻ | 3 | 4 | 1 | 1 | 1 | 0 | 1 | 0 | 0 |
| (4₂) Cl-[S]-Cl, CH₂P⁺(n-Bu)₃·Cl⁻ | (*) | (*) | (*) | (*) | (*) | (*) | (*) | (*) | (*) |
| (16₂) Cl-[S]-Cl, CH₂P⁺Ph₃·Cl⁻ | 1 | 3 | 2 | 0 | 0 | 0 | 0 | 0 | 0 |
| (17₁) Cl-[S]-CH₂P⁺Ph₃·Cl⁻ | 2 | 4 | 2 | 0 | 0 | 0 | (1) | 0 | 0 |
| (6₂) Br-[S]-Br, CH₂P⁺(n-Bu)₃·Cl⁻ | (*) | (*) | (*) | (*) | (*) | (*) | 0 | 0 | 0 |
| (18₂) Br-[S]-Br, CH₂P⁺Ph₃·Cl⁻ | 0 | 0 | 0 | 0 | 0 | 0 | 0 | 0 | 0 |

NOTE.—In this table, the letters a, b and c refer respectively to total plant height, length of second node to apex, and petiole length of the first trifoliate leaves.
*Indicates plants died due to phytotoxicity.

40 mls. of the appropriate compound dilution are sprayed on 4 plants in an area of five square feet.

The so-treated plants are moved to a greenhouse and remain there for 10 to 14 days. The degree of growth response is determined by measuring three parameters: total plant height, length of second node to apex, and petiole length of the first trifoliate leaves.

A "0" to "9" scale reading is used to express the degree of potential growth retardation. A "0" scale reading indicates growth retardation within the range of 0% to 10% as compared with the control. A "9" scale reading corresponds to 90% or more growth retardation.

A "(0)" to "(9)" scale rating is used to indicate the activity of potential growth promotants. "(0)" indicates growth promotion within the range of 0-10% as com-

EXAMPLE 3

Snap Bean Yield Test

Solvent: 9.5 ml. of water containing 0.01% by weight of polyoxyethylene soribtan monolaurate (Tween 20) as emulsifier.

To produce a suitable preparation of the particular active compound, 0.5 g. of such active compound is mixed with the stated amount of solvent containing the stated amount of emulsifier, and the resulting solution is then further diluted with such solvent containing said emulsifier to provide the rate of application indicated below in p.p.m.

Snap bean plants, when 5% to 10% of the flowers are in bloom, are sprayed (treated) with the given active compound preparation at a rate of 92.625 decaliters per hectare. The control plots receive no such treatment.

At harvest time the fresh weight of fruit from the treated and untreated plots is determined. The increase in yield of the treated plots is expressed as a percentage of the control yield.

The particular active compound tested, the rate of application and the results obtained can be seen from the following Table 3.

height of 2.45 cm. from the ground to determine the foliage yield from each plot;

(b) Grass growth by visual ratings that are based on a 0 to 100 scale, where 0 indicates no reduction in growth when compared with the control plots and 100 indicates complete suppression of additional grass growth.

The particular active compound tested, the rates of application and the results obtained can be seen from the following Table 4.

TABLE 4.—CHEMICAL MOWING OF KENTUCKY BLUEGRASS

| Active compound | P.p.m. of active compound applied | P.p.m. of maleic hydrazide applied | Average fresh green weight of the clippings, g. | Visual rating |
|---|---|---|---|---|
| ($1_6$) Cl—⟨S⟩—$CH_2\overset{\oplus}{P}(n\text{-Bu})_3 \cdot \overset{\ominus}{Cl}$ | 1,000 | 0 | 54.3 | 0 |
| Same as above | 200 | 0 | 48.2 | 0 |
| do | 1,250 | 3,750 | 16.1 | 77 |
| do | 0 | 5,000 | 29.9 | 73 |
| Control | 0 | 0 | 67.1 | 0 |

TABLE 3.—SNAP BEAN YIELD TEST

| Active compound | P.p.m. of active compound applied | Percent increase of snap bean yield |
|---|---|---|
| ($1_5$) Cl—⟨S⟩—$CH_2\overset{\oplus}{P}(n\text{-Bu})_3 \overset{\ominus}{Cl}$ | 200 | 26 |
| Control | 0 | 0 |

EXAMPLE 4

Chemical Mowing of Kentucky Bluegrass

Solvent: 9.5 ml. of water containing 0.01% by weight of polyoxyethylene sorbitan monolaurate (Tween 20) as emulsifier.

To produce a suitable preparation of the particular active compound, 0.5 g. of such active compound is mixed with the stated amount of solvent containing the stated amount of emulsifier, and the resulting solution is then further diluted with such solvent containing said emulsifier to provide the rates of application indicated below in p.p.m.

The preparation of the mixture of the particular active compound with maleic hydrazide (MH-30) is made by mixing together one part by weight of the given active compound and 3 parts by weight of maleic hydrazide (MH-30), mixing 0.5 g. of the resulting mass with the stated amount of solvent containing the stated amount of emulsifier, and then further diluting the concentrate so produced with such solvent containing said emulsifier to provide the rates of application indicated below in p.p.m.

Growing bluegrass sod is sprayed with the particular active compound preparation at the concentrations indicated. The treatment test plots are arranged in a randomized block design with 3 replications. The plots are mowed to a uniform height of 5 centimeters before spraying and then left for 5 weeks before readings are taken.

The degree of efficacy of the particular active compound is evaluated by two methods:

(a) A clipping from a 30 cm. x 30 cm. area at a height of 2.45 cm. from the ground to determine the foliage yield from each plot;

EXAMPLE 5

Chemical Mowing of Kentucky Fescue

Solvent: 9.5 ml. of water containing 0.01% by weight of polyoxyethylene sorbitan monolaurate (Tween 20) as emulsifier.

To produce a suitable preparation of the particular active compound, 0.5 g. of such active compound is mixed with the stated amount of solvent containing the stated amount of emulsifier, and the resulting solution is then further diluted with such solvent containing said emulsifier to provide the rates of application indicated below in p.p.m.

The preparation of the mixture of the particular active compound with maleic hydrazide (MH-30) is made by mixing together one part by weight of the given active compound and 3 parts by weight of maleic hydrazide (MH-30), mixing 0.5 g. of the resulting mass with the stated amount of solvent containing the stated amount of emulsifier, and then further diluting the concentrate so produced with such solvent containing said emulsifier to provide the rates of application indicated below in p.p.m.

Growing fescue grass sod is sprayed with the particular active compound preparation at the concentrations indicated. The treatment plots are arranged in a randomized block design with 3 replications. The plots are mowed to a uniform height of 5 centimeters before spraying and then left for 8 weeks before readings are taken.

The degree of efficacy of the particular active compound is evaluated by two methods:

(a) A clipping from a 30 cm. x 30 cm. area at a height of 2.45 cm. from the ground to determine the foliage yield from each plot;

(b) Grass growth by visual ratings that are based on a 0 to 100 scale, where 0 indicated no reduction in growth when compared with the control plots and 100 indicates complete suppression of additional grass growth.

The particular active compound tested, the rates of application and the results obtained can be seen from the following Table 5.

TABLE 5.—CHEMICAL MOWING OF KENTUCKY BLUEGRASS

| Active compound | P.p.m. of active compound applied | P.p.m. of maleic hydrazide applied | Average fresh green weight of the clippings, g. | Visual rating |
|---|---|---|---|---|
| ($1_7$) Cl—⟨S⟩—$CH_2\overset{\oplus}{P}(n\text{-Bu})_3 \cdot \overset{\oplus}{Cl}$ | 5,000 | 0 | 65.5 | 10 |
| Same as above | 1,250 | 3,750 | 64.3 | 15 |
| do | 0 | 5000 | 79.2 | 7 |
| Control | 0 | 0 | 103.2 | 0 |

EXAMPLE 6

Chemical Pruning of Elm Trees

Solvent: 9.5 ml. of water containing 0.01% by weight of polyoxyethylene sorbitan monolaurate (Tween 20) as emulsifier.

To produce a suitable preparation of the particular active compound, 0.5 g. of such active compound is mixed with the stated amount of solvent containing the stated amount of emulsifier, and the resulting solution is then further diluted with such solvent containing said emulsifier to provide the rates of application indicated below in p.p.m.

The preparation of the mixture of the particular active compound with maleic hydrazide (MH–30) is made by mixing together one part by weight of the given active compound and 3 parts by weight of maleic hydrazide (MH–30), mixing 0.5 g. of the resulting mass with the stated amount of solvent containing the stated amount of emulsifier, and then further diluting the concentrate so produced with such solvent containing said emulsifier to provide the rates of application indicated below in p.p.m.

3-year-old American Elm trees are used as test plants. The treatments are applied by spraying the given preparation on 2 limbs per tree with 3 replications. The retardation of twig growth is determined by measuring the length of the twig 17 weeks after treatment and comparing it to the length of the same twig before treatment. The percentage growth of the twig is compared with the percentage growth of untreated twigs, and the result expressed as percent inhibition of growth of the treated twigs.

The particular active compound tested, the rates of application and the results obtained can be seen from the following Table 6.

TABLE 6.—CHEMICAL PRUNING OF ELM TREES

| Active compound | P.p.m. of active compound applied | P.p.m. of maleic hydrazide applied | Percentage inhibition of growth of treated twig |
|---|---|---|---|
| (1s)  | 1,000 | 0 | 28 |
| Same as above | 200 | 0 | 26 |
| do | 40 | 0 | 7 |
| do | 1,250 | 3,750 | 42 |
| do | 250 | 750 | 25 |
| do | 0 | 5,000 | 37 |
| do | 0 | 1,000 | 39 |
| do | 0 | 500 | 40 |
| Control | 0 | 0 | 0 |

EXAMPLE 7

Soybean Yield Test

Solvent: 9.5 ml. of water containing 0.01% by weight of polyoxyethylene sorbitan monolaurate (Tween 20) as emulsifier.

To produce a suitable preparation of the particular active compound, 0.5 g. of such active compound is mixed with the stated amount of solvent containing the stated amount of emulsifier, and the resulting solution is then further diluted with such solvent containing said emulsifier to provide the rates of application indicated below in p.p.m.

Soybean plants of the variety Clark 63 are used as test plants, and are sprayed (treated) with the given active compound preparation at a rate of 92.625 decalitres per hectare, at a time when less than 5% of the flowers are in bloom. The treatment plots are arranged in a randomized block design with three replications. The control plots receive no such treatment.

The degree of efficacy of the given active compound is determined by weighing the seeds harvested from the given plot. The percentage reduction of plant height in the treated plots, when compared with the untreated control plots, is also included in the evaluation.

The particular active compound tested, the rates of application and the results obtained can be seen from the following Table 7.

TABLE 7.—SOYBEAN YIELD TEST

| Active compound | P.p.m. of active compound applied | Percent increase of soybean yield | Average plant height (cm.) |
|---|---|---|---|
| (1s) 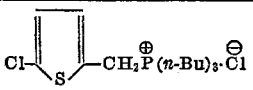 | 1,000 | 5 | 66.2 |
| Same as above | 200 | 21 | 85.7 |
| Control | 0 | 0 | 107.8 |

EXAMPLE 8

Pea Yield Test

Solvent: 9.5 ml. of water containing 0.01% by weight of polyoxyethylene sorbitan monolaurate (Tween 20) as emulsifier.

To produce a suitable preparation of the particular active compound, 0.5 g. of such active compound is mixed with the stated amount of solvent containing the stated amount of emulsifier, and the resulting solution is then further diluted with such solvent containing said emulsifier to provide the rate of application indicated below in p.p.m.

Pea plants, when 5% to 10% of the flowers are in bloom, are sprayed (treated) with the given active compound preparation at a rate of 92.625 decaliters per hectare. The treatment plots are arranged in a randomized block design with 3 replications. The control plots receive no such treatment.

At harvest time the fresh weight of fruit from the treated and untreated plots is determined. The increase in yield of the treated plots is expressed as a percentage of the control yield.

The particular active compound tested, the rate of application and the results obtained can be seen from the following Table 8.

TABLE 8.—PEA YIELD TEST

| Active compound | P.p.m. of active compound applied | Percent increase of pea yield |
| --- | --- | --- |
| (I₁₀) 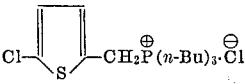 | 12.5 | 13 |
| Control | 0 | 0 |

EXAMPLE 9

Apple Fruit-Set Test

Solvent: 9.5 ml. of water containing 0.01% by weight of polyoxyethylene sorbitan monolaurate (Tween 20) as emulsifier.

To produce a suitable preparation of the particular active compound, 0.5 g. of such active compound is mixed with the stated amount of solvent containing the stated amount of emulsifier, and the resulting solution is then further diluted with such solvent containing said emulsifier to provide the rates of application indicated below in p.p.m.

Six-year-old Golden Delicious apple trees are used as test plants, and single limbs of these trees are sprayed (treated) with the given active compound preparation at a rate of 277.785 decaliters per hectare twelve days after full bloom. Each treatment is replicated 3 times and each replicate is on separate trees. The control plots receive no such treatment.

The degree of efficacy of the given active compound is determined by substracting the number of fruits remaining on the treated limbs after June drop from the original number of fruit set per limb that are counted prior to treatment.

The particular active compound tested, the rates of application and the results obtained can be seen from the following Table 9.

TABLE 9.—APPLE FRUIT-SET TEST

| Active compound | P.p.m. of active compound applied | Percent increase in fruit set |
| --- | --- | --- |
| (I₁₁) 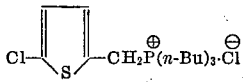 | 160 | 9 |
| Same as above | 40 | 36 |
| Control | 0 | 0 |

EXAMPLE 10

Peach Fruit-Set Test

Solvent: 9.5 ml. of water containing 0.01% by weight of polyoxyethylene sorbitan monolaurate (Tween 20) as emulsifier.

To produce a suitable preparation of the particular active compound, 0.5 g. of such active compound is mixed with the stated amount of solvent containing the stated amount of emulsifier, and the resulting solution is then further diluted with such solvent containing said emulsifier to provide the rates of application indicated below in p.p.m.

Ten-year-old Redhaven peach trees are used as test plants, and single limbs of these trees are sprayed (treated) with the given active compound preparation at a rate of 277.785 decaliters per hectare 5 days after full bloom. Each treatment is replicated 3 times and each replicate is on separate trees. The control plots receive no such treatment.

The degree of efficacy of the given active compound is determined by subtracting the number of fruits remaining on the treated limbs at hand thinning time from the original number of flowers set per limb that are counted prior to treatment.

The particular active compound tested, the rates of application and the results obtained can be seen from the following Table 10.

TABLE 10.—PEACH FRUIT-SET TEST

| Active compound | P.p.m. of active compound applied | Percent increase in fruit set |
| --- | --- | --- |
| (I₁₂) 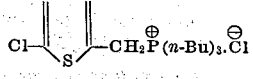 | 60 | 7 |
| Same as above | | 43 |
| Control | 0 | 0 |

EXAMPLE 11

Defoliant-Desiccant-Regrowth Control Test (Synergism with S,S,S-tri-n-butyl phosphorotrithioate—DEF.)

Solvent: 24.5 ml. water containing 0.01% by weight of polyoxyethylene sorbitan monolaurate (Tween 20) as emulsifier.

To produce a suitable preparation of the particular active compound, 0.5 gram of such active compound is mixed with the stated amount of solvent containing the stated amount of emulsifier, and the resulting solution is then further diluted with such solvent containing said emulsifier to provide the below indicated rates of application of active compound.

To produce the synergistic mixtures of the particular active compound with S,S,S tri-n-butyl phosphorotrithioate (DEF), the two ingredients are mixed in the proportions of 1 part by weight of such given active compound with respectively 1, 2 and 4 parts by weight of said S,S,S-tri-n-butyl phosphorotrithioate (DEF); then 0.5 g. of each of these mixtures is mixed with the stated amount of solvent containing the stated amount of emulsifier, and the resulting solution is then further diluted with such solvent containing said emulsifier to provide the rates of application indicated below in kg. of active ingredient per hectare, in a total volume of 32 decaliters per hectare.

Cotton plants in the "squaring" (pre-bloom) stage are sprayed with the given active compound preparation until just dew moist. For each test, 25 mls. of the appropriate active compound or synergistic mixture dilution are sprayed on two plants in an area of five square feet. The number of leaves on the plants is recorded.

After 7 days, the degree of desiccation is determined and expressed as a percentage, wherein 0% means that there is no desiccation and 100% means that there is complete desiccation.

After 7 days, the degree of defoliation is also determined and expresed as the percentage of the leaves which defoliated, i.e. which fall from the particular plant, wherein 0% means that there is no defoliation and 100% means that there is complete defoliation.

After 7 days, the degree of regrowth inhibition is also determined and expressed as a percentage, wherein 0% means that there is no regrowth inhibition and 100% means that there is complete regrowth inhibition.

The particular active compound and synergistic mixtures tested, the rates of application, and the results obtained can be seen from the following Table 11.

relatively smooth (6–7 days old) and are capable of absorbing and translocating chemicals, are sprayed (treated)

TABLE 11.—DEFOLIANT-DESICCANT—REGROWTH CONTROL TEST

| First active compound | Rate of first active compound applied, kg./hectare | Second active compound | Rate of second active compound applied, (kg./hectare) | Defoliation ª at— 5 days | Defoliation ª at— 7 days | Regrowth control ᵇ at 7 days |
|---|---|---|---|---|---|---|
| (1₁₃) Cl—[ring]—S—CH₂P(n-Bu)₃·Cl | 1.12 | (B) (n-Bu)₂SPS-n-Bu (known) | 1.12 | 124 | 106 | 80 |
| Same as above | 0.6 | Same as above | 1.12 | 121 | 97 | 36 |
| do | 0.3 | do | 11.12 | 118 | 102 | 36 |
| do | 1.12 | do | 0.6 | 143 | 116 | 20 |
| do | 0.6 | do | 0.6 | 120 | 108 | 0 |
| do | 0.3 | do | 0.6 | 73 | 92 | 0 |
| do | 0 | do | 1.12 | 100 *(68) | 100 *(91) | 0 |
| do | 0 | do | 0.6 | 100 *(49) | 100 *(63) | 0 |

ª Defoliation data is based on percent of S,S,S-tri-n-butyl phosphorotrithioate (B) (DEF) where 100 is equal to trithioate (DEF) alone at the same rate, i.e. 1.12 or 0.6 kg./hectare as the case may be.
ᵇ Rating: 0 is no effect; 100 is complete inhibition of new growth.

*Figures in parentheses is actual percent defoliation from treatments with S,S,S-tri-n-butyl phosphorotrithioate (DEF) a corresponding stated rate.

EXAMPLE 12

Comparative Chlorophyll Destruction Test
(in foliar application)

Wettable powder base consisting of:

92 parts by weight hydrated silica (ultra fine, "Hi-Sil 233")
4 parts by weight sodium lignin sulfonate ("Marasperse N")
4 parts by weight polycondensate of ethylene oxide, propylene oxide and propylene glycol (mol. wt. about 1000) ("Pluronic L-61")

To produce a suitable preparation of the particular active compound, 1 part by weight of such active compound is mixed intimately with 1 part by weight of the stated wettable powder base, and the resulting mixture is diluted with water, containing 0.01% polyoxyethylene sorbitan monolaurate (Tween 20) as emulsifier, to the desired final concentration.

Snap bean plants, as soon as the primary leaves are relatively smooth (6–7 days old) and are capable of absorbing and translocating chemicals, are sprayed (treated) with the given active compound preparation at the indicated concentration until just dew moist. For each test, 40 mls. of the appropriate compound dilution are sprayed on 4 plants in an area of five square feet.

The so-treated plants are moved to a greenhouse and remain there for 10 to 14 days. The degree of growth response is determined by measuring two parameters: total plant height, and the petiole length of the first trifoliate leaves; and the percentage chlorophyll destruction in the primary and trifoliate leaves is also measured.

The particular active compound tested, the rates of application in p.p.m. and the results obtained can be seen from the following Table 12.

TABLE 12.—COMPARATIVE CHLOROPHYLL DESTRUCTION TEST (IN FOLIAR APPLICATION)

| Active compound | P.p.m. of active compound applied | Plant height, (c.m.) | Petiole length of 1st trifoliate leaf (cm.) | Percent chlorophyll destruction Primary leaves | Percent chlorophyll destruction Trifoliate leaves |
|---|---|---|---|---|---|
| (A) Cl—[ring]—CH₂P(n-Bu)₃·Cl (known) | 10,000 | (*) | (*) | (*) | (*) |
|  | 1,000 | 12.6 | 2.3 | **70 | 0 |
|  | 100 | 21.2 | 9.6 |  |  |
| (1₁₄) Cl—[ring]—S—CH₂P(n-Bu)₃·Cl | 10,000 | 11.4 | 0.7 | 60 | 20 |
|  | 1,000 | 12.8 | 1.2 | 50 | 0 |
|  | 100 | 19.3 | 8.4 | 0 | 0 |
| Control | 0 | 19.3 | 8.4 | 0 | 0 |

*Plants were lost due to chemical injuries.
**50% of the primary leaves were abscissed and the remainder scored 70% losses of chlorophyll content.

Conclusion.—Foliar spray applications with active compound (1) resulted in somewhat reduced chlorophyll destruction when compared with the above-noted known prior art compound (A).

Even more significant is the fact that the latter, at a rate of 10,000 p.p.m., was too phytotoxic to evaluate the chemical effect thereof, while at a rate of 1,000 p.p.m. it induced 50% abscission of the primary leaves. By contrast, such active compound (1) showed no abscission of the primary leaves at any of the rates tested.

The process for producing the instant active compounds according to the present invention is illustrated without limitation by the following further examples:

EXAMPLE 13

(1₁₃)

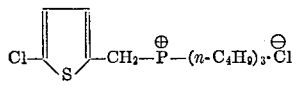

249 g. (1.5 M) of 5-chloro-2-thenyl chloride are dissolved in 1,000 ml. of anhydrous diethyl ether, and 303 g. (1.5 M) of tri-n-butyl phosphine are added over 1 hr. at ambient temperature with vigorous stirring.

A white precipitate begins to form after 20 minutes. The mixture is allowed to stand for 5 days and the precipitate removed by filtration, washed with anhydrous ether and air-dried.

386.5 g. (70% of the theory) of 5-chloro-2-thenyl-tri-n-butyl phosphonium chloride are obtained, m.p. 157°–159° C.

The following compounds are prepared in analogous manner:

| Compound No. | Structure | M.P., ° C. |
|---|---|---|
| (3₃) | ⟨S⟩—CH₂P⁺(n-Bu)₃·Cl⁻ | 124–129. |
| (5₃) | Br—⟨S⟩—CH₂P⁺(n-Bu)₃Cl⁻ | 145–147. |
| (12₃) | Br—⟨S⟩—CH₂P⁺Ph₃Cl⁻ | 218–224. |
| (4₃) | Cl—⟨S⟩(Cl)—CH₂P⁺(n-Bu)₃Cl⁻ | 160–162. |
| (16₃) | Cl—⟨S⟩(Cl)—CH₂P⁺Ph₃Cl⁻ | 226–230. |
| (17₃) | Cl—⟨S⟩—CH₂P⁺Ph₃Cl⁻ | 240–241. |
| (6₃) | Br—⟨S⟩(Br)—CH₂P⁺(n-Bu)₃Cl⁻ | 116–120. |
| (18₃) | Br—⟨S⟩(Br)—CH₂P⁺Ph₃Cl⁻ | (Waxy solid). |
| (19₂) | ⟨S⟩—CH₂P⁺Ph₃Cl⁻ | 302–305. |
| (20₂) | ⟨S⟩—CH₂P⁺(n-C₈H₁₇)₃Cl⁻ | (Sticky solid). |
| (10₂) | Cl—⟨S⟩—CH₂P⁺(n-C₈H₁₇)₃Cl⁻ | 73–75. |
| (11₂) | Br—⟨S⟩—CH₂P⁺(n-C₈H₁₇)₃Cl⁻ | 70.5–72. |

EXAMPLE 14

(2₂)

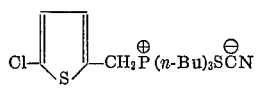

1.5 g. (0.05 M) of 5-chloro-2-thenyl tri-n-butyl phosphonium chloride, prepared according to Example 13, are dissolved in a mixture of 190 ml. acetone and 10 ml. anhydrous ethanol. A solution of 4.9 g. (0.05 M) potassium thiocyanate in 60 ml. acetone is added with vigorous stirring.

The white KCl precipitate, which forms instantly, is allowed to age and then removed by filtration and discarded. The solvent is removed from the filtrate by stripping and the residue taken up in ethyl acetate, filtered remove any unreacted starting materials, and stripped again.

The resulting yellow oil, on trituration with hexane, yielded a solid.

18.6 g. (97% of the theory) of 5-chloro-2-thenyl-tri-n-butyl phosphonium thiocyanate are obtained, m.p. 36° C.

The following compounds are prepared in analogous manner:

| Compound number | Structure | M.P., ° C. |
|---|---|---|
| (21₂) | Cl—⟨S⟩—CH₂P⁺(n-C₈H₁₇)₃SCN⁻ | Liquid, $n_D^{20}$ = 1.5243. |
| (9₂) | Br—⟨S⟩—CH₂P⁺(n-Bu)₃·S⁻—P(S)(OEt)₂ | Liquid, $n_D^{25}$ = 1.5544. |
| (14₂) | Br—⟨S⟩—CH₂P⁺(n-C₈H₁₇)₃SCN⁻ | Liquid $n_D^{25}$ = 1.5282. |
| (24₂) | ⟨S⟩—CH₂P⁺(n-Bu)₃·SCN⁻ | 79–80.5. |
| (25₂) | Cl—⟨S⟩(Cl)—CH₂P⁺(n-Bu)₃·SCN⁻ | 49–51. |
| (26₂) | ⟨S⟩—CH₂P⁺(n-Bu)₃·S⁻—C(S)OEt | 58–60. |
| (27₂) | Cl—⟨S⟩(Cl)—CH₂P⁺(n-Bu)₃·S⁻—C(S)NMe₂ | 74–76. |

EXAMPLE 15

(22₂)

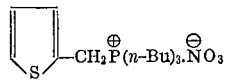

10.0 g. (approx. 0.03 M) of 2-thenyl tri-n-butyl phosphonium chloride, prepared according to Example 13, is dissolved in 50 ml. boiling ethanol and added to a refluxing solution of 5.1 g. (0.03 M) of silver nitrate in 200 ml. ethanol; with vigorous stirring.

The white AgCl precipitate, which forms instantly, is allowed to age and then removed by filtration and discarded. The solvent is removed from the filtrate by stripping.

The resulting yellow oil, on trituration with ethyl acetate, yields a solid.

7.4 g. (71% of the theory) of 2-thenyl-tri-n-butyl phosphonium nitrate are obtained, m.p. (after recrystallization from ethyl acetate) 87°–87.5° C.

The following compound is prepared in analogous manner:

| Compound number | Structure | M.P., ° C. |
|---|---|---|
| (23₂) | 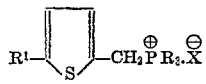 | 119–121. |

It will be realized by the artisan that all of the foregoing compounds contemplated by the present invention possess one or more of the desired plant growth regulating properties, as well as a comparatively low phytotoxicity and a concomitantly low mammalian toxicity, enabling such compounds to be used with correspondingly favorable compatibility with warm-blooded creatures for more effective growth-regulating, e.g. growth-promoting and growth-retarding, purposes.

It will be appreciated that the instant specification and examples are set forth by way of illustration and not limitation, and that various modifications and changes may be made without departing from the spirit and scope of the present invention, which is to be limited only by the scope of the appended claims.

What is claimed is:

1. A 2-thenyl-phosphonium salt of the formula $$R^1 \underset{S}{\overset{}{\bigcirc}} CH_2 \overset{\oplus}{P} R_3 \cdot \overset{\ominus}{X}$$

in which
R¹ is halo,
R each individually is butyl, and
X is a monovalent anion selected from the group consisting of halide, thiocyanate, nitrate, O,O-diethyl-dithiophosphate, O-ethyl xanthate and N,N-dimethyl dithiocarbamate.

2. Compound according to claim 1 wherein R' is selected from the group consisting of chloro and bromo, and X is a monovalent anion selected from the group consisting of chloride, bromide, thiocyanate, nitrate, O,O-diethyl dithiophosphate, O-ethyl xanthate and N,N-dimethyl dithiocarbamate.

3. Compound according to claim 1 wherein said R' is selected from the group consisting of chloro and bromo, and X is chloride.

4. Compound according to claim 1 wherein such compound is (5-chloro-2-thenyl)-(tri-n-butyl)-phosphonium chloride of the formula

5. Compound according to claim 1 wherein such compound is (5-bromo-2-thenyl)-(tri-n-butyl)-phosphonium chloride of the formula

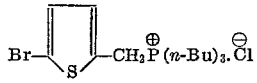

6. Compound according to claim 1 wherein such compound is 5-chloro-(2-thenyl)-(tri-n-butyl)-phosphonium thiocyanate of the formula (2₂)

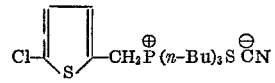

7. Compound according to claim 1 wherein such compound is (5-chloro-2-thenyl)-(tri-n-butyl)-phosphonium chloride of the formula (1₇)

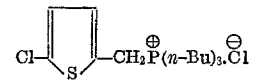

References Cited
UNITED STATES PATENTS 3,230,069   1/1966   Preston _____ 71—2.7
3,268,323   8/1966   Goyette _____ 71—2.3

OTHER REFERENCES

Shevchuk, et al., Chem. Abs. 60, 15810–1 (1964).
Jones, et al., Chem. Abs. 63, 12517 (1965).

JOHN D. RANDOLPH, Primary Examiner

U.S. Cl. X.R.

71—76, 86; 260—329 R, 332.2 R

CERTIFICATE OF CORRECTION

Patent No. 3,847,947    Dated November 12, 1974

Inventor(s) Peter F. Epstein    (Page 1 of 2)

It is certified that error appears in the above-identified patent and that said Letters Patent are hereby corrected as shown below:

Col. 7, line 72, cancel "vhicle assistan" and substitute

-- vehicle assistant --.

Col. 9, Table 1, Compound ($3_1$), cancel "Same as above......"

and substitute --  --.

Col. 14, in the heading of Table 5, cancel "BLUEGRASS" and substitute -- FESCUE --.

Col. 13, Table 5, Compound ($1_7$), correct formula to read as follows:

-- 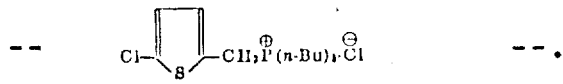 --.

Col. 18, Table 10, under heading "P.p.m. of.........applied"

cancel ".........." and substitute -- 20 --.

Col. 19, Table 11, Compound ($1_{13}$) correct formula to read as follows: -- 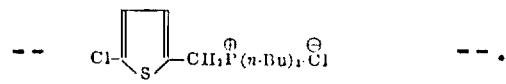 --.

Col. 19, Table 11 Compound (B), correct formula to read as follows:

-- --.

CERTIFICATE OF CORRECTION

Patent No. 3,847,947   Dated November 12, 1974

Inventor(s) _____ (Page 2 of 2)

It is certified that error appears in the above-identified patent and that said Letters Patent are hereby corrected as shown below:

Col. 19, Table 11, in the "*" footnote, after "(DEF)", cancel "a" and substitute -- at --.

Col. 22, line 6, cancel "1.5 g" and substitute -- 18.5 g --.

Col. 22, in Example 14 Table, Compound ($26_2$), correct the formula to read as follows:

Col. 22, in Example 14 Table, Compound ($27_2$), correct the formula to read as follows:

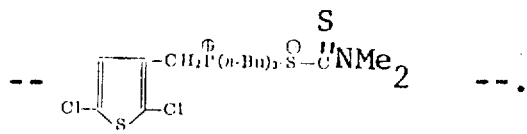

Col. 23, claim 1, line 3 after the structural formula, cancel "R each individually is butyl" and substitute -- R is butyl --.

Col. 24, cancel claim 7.

Signed and Sealed this

Twenty-first Day of September 1976

[SEAL]

Attest:

RUTH C. MASON
Attesting Officer

C. MARSHALL DANN
Commissioner of Patents and Trademarks